US010160674B2

(12) United States Patent
Madolora

(10) Patent No.: US 10,160,674 B2
(45) Date of Patent: Dec. 25, 2018

(54) IMPROVING WASTEWATER PUMPING AND CONVEYING EFFICIENCY

(71) Applicant: Premier Magnesia, LLC, West Conshohocken, PA (US)

(72) Inventor: Matthew P. Madolora, Austin, TX (US)

(73) Assignee: Premier Magnesia, LLC, Wayne, PA (US)

( * ) Notice: Subject to any disclaimer, the term of this patent is extended or adjusted under 35 U.S.C. 154(b) by 167 days.

(21) Appl. No.: 13/853,465

(22) Filed: Mar. 29, 2013

(65) Prior Publication Data

US 2013/0264290 A1 Oct. 10, 2013

Related U.S. Application Data

(60) Provisional application No. 61/618,336, filed on Mar. 30, 2012.

(51) Int. Cl.
*C02F 1/66* (2006.01)
*C02F 5/08* (2006.01)
(Continued)

(52) U.S. Cl.
CPC ............... *C02F 1/66* (2013.01); *C02F 5/083* (2013.01); *C02F 1/68* (2013.01); *C02F 2101/30* (2013.01);
(Continued)

(58) Field of Classification Search
CPC . C02F 1/66; C02F 1/5254; C02F 5/08–5/105; C02F 1/5236;
(Continued)

(56) References Cited

U.S. PATENT DOCUMENTS 5,833,864 A * 11/1998 Miller et al. ............. 210/724
6,379,555 B1 * 4/2002 Targosz ..................... 210/663
(Continued)

OTHER PUBLICATIONS

Thomas, "Air Management in Water Distribution Systems, A New Understanding of Air Transfer," Jan. 2003, pp. 1-21.*
(Continued)

*Primary Examiner* — Robert Clemente
*Assistant Examiner* — Akash K Varma
(74) *Attorney, Agent, or Firm* — Jeffrey T. Placker; Holland & Knight LLP

(57) ABSTRACT

Methods and systems for improving pumping or conveyance efficiencies of wastewater within a wastewater treatment system is described. In an embodiment, an effective amount of a magnesium compound may be added to wastewater within a wastewater treatment system to increase at least one of a pumping and a conveyance efficiency of the wastewater within at least a portion of the wastewater treatment system. In an embodiment, the method may also include measuring at least one or the pumping efficiency and the conveyance efficiency of the wastewater within the portion of the wastewater treatment system. A concentration of the added magnesium compound may be adjusted to increase at least one of the pumping and the conveyance efficiency within the portion of the wastewater treatment system. Other methods and systems are described.

18 Claims, 2 Drawing Sheets

(51) Int. Cl.
*C02F 1/68* (2006.01)
*C02F 101/30* (2006.01)

(52) U.S. Cl.
CPC ...... *C02F 2209/06* (2013.01); *C02F 2209/09* (2013.01)

(58) Field of Classification Search
CPC ............ C02F 2209/003; C02F 2209/38; C02F 2209/40; C02F 2209/42
USPC .................................................. 210/739, 749
See application file for complete search history.

(56) References Cited

U.S. PATENT DOCUMENTS

| | | |
|---|---|---|
| 7,533,420 B2 | 5/2009 | Battagin et al. |
| 8,206,680 B2 | 6/2012 | Diaz Chavez et al. |
| 2006/0006121 A1* | 1/2006 | Simpson et al. .............. 210/749 |

OTHER PUBLICATIONS

Gibson et al., "The Use of Magnesium Hydroxide Slurry as a Safe and Cost Effective Solution for H2S Odor, Corrosion, and FOG in Sanitary Sewer Systems," Martin Marietta, Sep. 1, 2007, pp. 1-7.*
Gibson et al., "The Use of Magnesium Hydroxide Slurry as a Safe and cost Effective Solution for H2S Odor, Corrosion , and FOG in Sanitary Sewer Systems," Martin Marietta, downloaded on Jul. 8, 2014, pp. 1-7.

* cited by examiner

IMPROVING WASTEWATER PUMPING AND CONVEYING EFFICIENCY

CROSS-REFERENCE TO RELATED APPLICATIONS

This application claims the benefit of U.S. provisional patent application Ser. No. 61/618,336, filed on 30 Mar. 2012, and entitled "Methods and Compositions for Improved Efficiency of Conveying Wastewater," the entire disclosure of which is incorporated herein by reference.

TECHNICAL FIELD

The present disclosure generally relates to wastewater treatment, and more particularly relates to improving pumping or conveyance efficiency within wastewater treatment systems.

BACKGROUND

Wastewater treatment systems, such as municipal wastewater collection and treatment systems, typically rely on a combination of gravity conveyance and pumping to transport wastewater from various collections points to, and even through, wastewater treatment plants. Various factors may impede the conveyance of wastewater throughout the system, which may reduce the efficiency of the wastewater treatment system and/or may increase the required service and maintenance associated with the wastewater treatment system. In either circumstance the cost of operating the wastewater treatment system may be increased. For example, a decrease in efficiency may result in increased energy costs to operate the wastewater treatment system and/or a decreased throughput of the wastewater treatment system. An increase in the required service and maintenance may result from expenditures in equipment repair and replacement and the number of maintenance man-hours that may be required to keep the wastewater treatment system operating at an acceptable level.

Some factors that may impede the conveyance of wastewater throughout the wastewater treatment system may include, for example, debris and obstructions in the system, the accumulation of fat, oil, and grease ("FOG") in the system, which may act as an obstruction to the flow of wastewater, gas evolution and/or accumulation in the system, etc. As noted, often remedying such causes of pumping or conveyance inefficiencies may involve collection systems operators and maintenance crews spending relatively significant amounts of time and money on physically, chemically or biologically reducing FOG or other debris from force mains, collection lines, pumps and wet wells, and/or installing and providing maintenance for air relief valves ("ARV's") designed to relieve air and gases that may accumulate in collection lines.

SUMMARY

According to an implementation, a method may include adding an effective amount of a magnesium compound to wastewater within a wastewater treatment system. The effective amount of the magnesium compound may be sufficient to increase at least one of a pumping and a conveyance efficiency of the wastewater within at least a portion of the wastewater treatment system.

One or more of the following features may be included. The method may also include measuring at least one of the pumping and the conveyance efficiency of the wastewater within the portion of the wastewater treatment system. A concentration of the added magnesium compound may be adjusted to increase at least one of the pumping and the conveyance efficiency within the portion of the wastewater treatment system. Adjusting the concentration of the magnesium compound may include adjusting the concentration of the magnesium compound to provide a pH of the wastewater in the portion of the wastewater treatment system of between about 7.5 and about 9. Adjusting the concentration of the magnesium compound may include adjusting the concentration of the magnesium compound to provide between about 0.5 mg/L to about 10,000 mg/L of magnesium hydroxide in the wastewater in the portion of the wastewater treatment system.

The magnesium compound may include one or more of magnesium oxide and magnesium hydroxide. Adding the magnesium compound may include adding a magnesium hydroxide slurry to the wastewater. The magnesium hydroxide slurry may include between about 1% to about 90% magnesium hydroxide solids.

The effective amount of the magnesium compound may include an effective amount to reduce one or more of accumulation and emission of gasses within the wastewater in the portion of the wastewater treatment system. The effective amount of the magnesium compound may include an effective amount to reduce one or more of occlusion and accumulation of fat, oil and grease in the portion of the wastewater treatment system.

According to another aspect, a method may include adding an effective amount of a magnesium compound to wastewater within a wastewater treatment system. The effective amount of the magnesium compound may be sufficient to reduce one or more of accumulation and emission of gasses within the wastewater within at least a portion of the wastewater treatment system.

One or more of the following features may be included. The method may include measuring a gas volume generated in the portion of the wastewater treatment system. A concentration of the added magnesium compound may be adjusted to reduce the measured gas volume generated in the portion of the wastewater treatment system. The method may include measuring a gas volume of gasses expelled from one or more air release valves associated with the portion of the wastewater treatment system. A concentration of the added magnesium compound may be adjusted to reduce the measured gas volume of gasses expelled from the one or more air release valves.

The magnesium compound may include one or more of magnesium oxide and magnesium hydroxide. The effective amount of the magnesium compound may achieve a pH of between about 7.5 to about 9 in the wastewater within the portion of the wastewater treatment system. The effective amount of the magnesium compound may achieve a concentration of magnesium hydroxide within the wastewater of between about 0.5 mg/L to about 10,000 mg/L within the portion of the wastewater treatment system.

According to another implementation, a method may include adding an effective amount of a magnesium compound to wastewater within a wastewater treatment system. The effective amount of the magnesium compound may be sufficient to reduce one or more of occlusions and accumulation of fat, oil and grease within in at least a portion of the wastewater treatment system.

One or more of the following features may be included. The method may include measuring one or more fat, oil, and grease accumulations within the portion of the wastewater treatment system. A concentration of the added magnesium compound may be adjusted to reduce the measured fat, oil, and grease accumulations within the portion of the wastewater treatment system.

The magnesium compound may include one or more of magnesium oxide and magnesium hydroxide. The effective amount of the magnesium compound may achieve a pH of between about 7.5 to about 9 in the wastewater within the portion of the wastewater treatment system. The effective amount of the magnesium compound may achieve a concentration of magnesium hydroxide within the wastewater of between about 0.5 mg/L and about 10,000 mg/L within the portion of the wastewater treatment system.

The details of one or more implementations are set forth in the accompanying drawings and the description below. Other features and advantages will become apparent from the description, the drawings, and the claims.

DESCRIPTION OF EXAMPLE EMBODIMENTS

Figure 1:
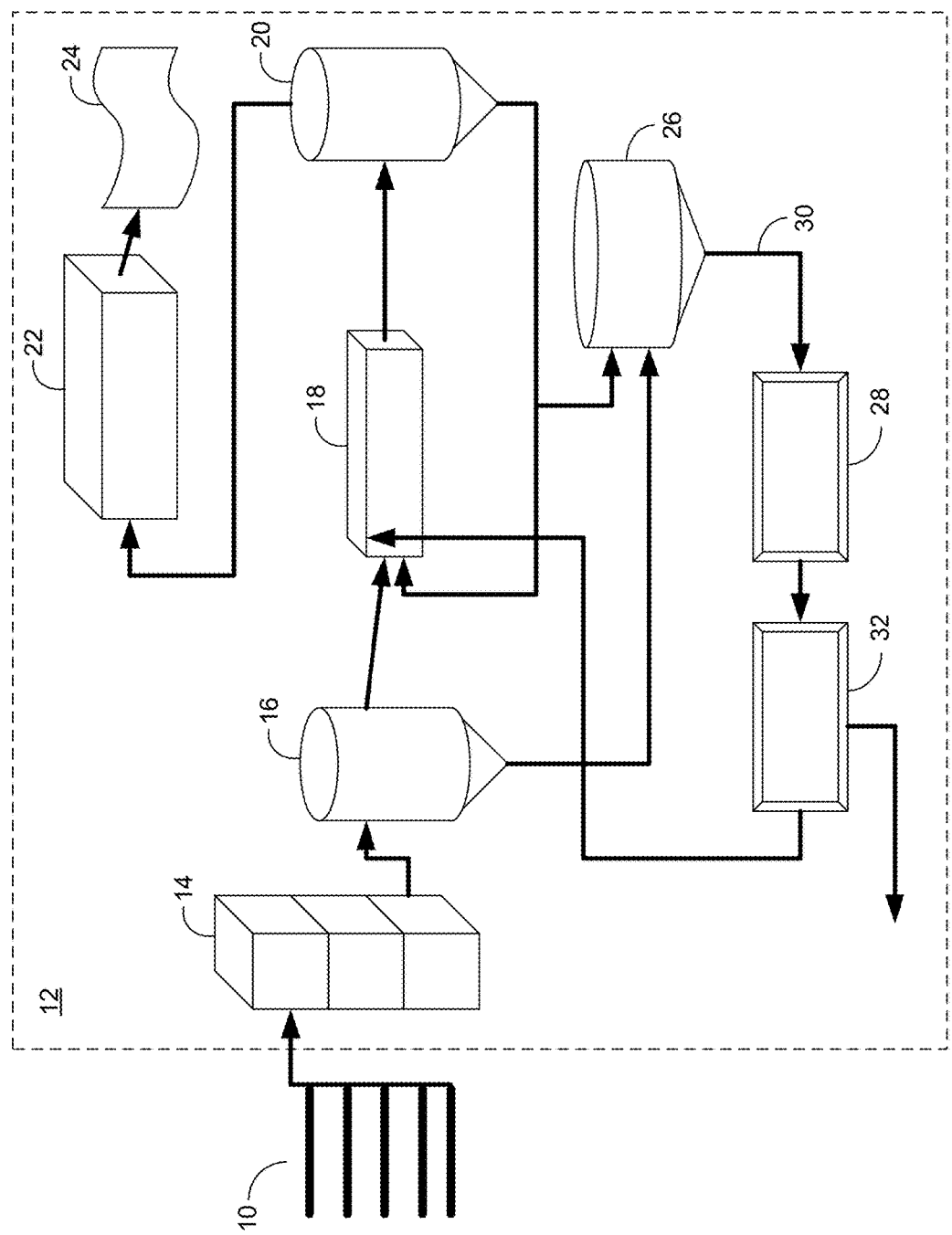
FIG. 1 schematically depicts an example embodiment of a wastewater treatment system.

According to some example implementations consistent with the present disclosure wastewater pumping and/or conveyance efficiency within a wastewater treatment system may be improved through the use of magnesium compounds added to wastewater within the wastewater treatment system. In some embodiments, the use of magnesium compounds added to the wastewater may, for example, improve pumping and/or conveyance efficiencies of at least a portion of a wastewater treatment system by reducing the accumulation and/or the emission of gasses within the wastewater. In some embodiments, the use of magnesium compounds added to the wastewater may, for example, decrease the accumulation of FOG within at least a portion of the wastewater treatment system, and/or may decrease or remove FOG occlusions within at least a portion of the wastewater treatment system. Further, combined reductions in gas accumulation and/or emissions and reductions in FOG accumulation and/or occlusions may also be realized in some embodiments, which may give rise to more pronounced increases in wastewater pumping and/or conveyance within at least a portion of the wastewater treatment system. While example embodiments described herein generally pertain to the use of magnesium compounds, all of the described embodiments may similarly be implemented using sodium hydroxide, calcium oxide, calcium hydroxide, and/or combinations thereof as an alternative to magnesium compounds. Accordingly, the instant disclosure should be understood to include the alternative use of such compounds in all described embodiments.

According to an embodiment, a method for increasing wastewater pumping and/or conveyance efficiency within a wastewater treatment system may include adding an effective amount of a magnesium compound to wastewater within the wastewater treatment system. The effective amount of the magnesium compound may be sufficient to increase at least one of a pumping efficiency and a conveyance efficiency of the wastewater within at least a portion of the wastewater treatment system. The portion of the wastewater treatment system may include, for example, a portion of the wastewater treatment system that is downstream from a location at which the magnesium compound may be added to the wastewater treatment system, and therefore, may be affected by the addition of the magnesium compound. It will be appreciated that, depending upon the degree to which the flow of wastewater to which the magnesium compound is diluted (e.g., by further addition or combination with additional flows or supplies of wastewater) the efficacy of the added magnesium compound may deteriorate as a result of such dilution. In such a situation, the portion of the wastewater treatment system for which the pumping and/or conveyance efficiency may be increased may include a portion of the wastewater treatment system between the point at which the magnesium compound is added to the wastewater treatment system and a point at which a concentration of the magnesium compound is diluted below an effected amount of the magnesium compound in the wastewater.

For example, the wastewater treatment system may include a wastewater collection system, and a wastewater processing system. The wastewater collection system may generally allow for the transport of wastewater from collection points (e.g., individual homes or businesses, in an example of a municipal wastewater treatment system) to the wastewater processing system, where the wastewater may be processed (e.g., to remove solids, contaminants, etc.) and discharged to the environment. Wastewater may be moved through the wastewater treatment system through a combination of pumping systems and gravity conveyance systems. As generally discussed above, pumping and/or conveyance of the wastewater through the wastewater treatment system may be impeded by a variety of factors. Two such factors may include the accumulation and/or emission of gasses within the wastewater, which may, for example, create backpressure within wastewater transport pipes (e.g., forcemains of the wastewater treatment system) that must be overcome by pumps within the wastewater treatment system. Further, in some situations, gasses present in the wastewater in wet wells of the wastewater treatment system reduce the suction head at the inlet of pumps within the wastewater treatment system, which may reduce the pumping efficiency of pumps within the wastewater treatment system. FOG accumulation, which may lead to occlusions within the wastewater transport pipes, may similarly require increased pumping pressures to overcome the restrictions resulting from FOG accumulation and/or occlusions within the wastewater transport pipes and/or may reduce pumping efficiency as a result of decreased suction head at the inlet of pumps within the wastewater treatment system.

In some embodiments, an effective amount of magnesium compounds may be added to wastewater within at least a portion of the wastewater treatment system to increase wastewater pumping and/or conveyance efficiency, for example, through the reduced accumulation and/or emission of gasses within the wastewater and/or through the reduced accumulation of FOG and/or occlusions caused by FOG accumulation. In an embodiment, the magnesium compound may include one or more of magnesium oxide and magnesium hydroxide. One example of a suitable, commercially available magnesium compound may include Thioguard®, magnesium hydroxide, available from Premier Magnesia, LLC, of West Conshohocken, Pa. However, various additional and/or alternative magnesium oxide and/or magnesium hydroxide compounds may suitably be utilized. Further, in some embodiments, the magnesium compound may be provided as a slurry, e.g., which may facilitate the addition of the magnesium compound to the wastewater and/or mixing and distribution of the magnesium compound throughout the wastewater. In such an embodiment, adding the magnesium compound to the wastewater may include adding a magnesium hydroxide slurry to the wastewater. In some embodiments, the magnesium hydroxide slurry may be provided including between about 1% to about 90% magnesium hydroxide solids. In an embodiment, the magnesium hydroxide slurry may include between about 25% to about 90% magnesium hydroxide solids. In an embodiment, the magnesium hydroxide slurry may include between about 30% to about 70% magnesium hydroxide solids. In some embodiments, the magnesium hydroxide slurry may include between about 40% to about 70% magnesium hydroxide solids. The amount of magnesium hydroxide solids included within the magnesium hydroxide slurry may be based on, for example, the chemistry of the wastewater, the method of delivery of the magnesium hydroxide slurry, and/or other factors.

Adding an effective amount of the magnesium compound to the wastewater to improve the pumping and/or conveyance efficiency may include measuring at least one of the pumping and the conveyance efficiency of the wastewater within the portion of the wastewater treatment system. Further, a concentration of the added magnesium compound may be adjusted to increase at least one of the pumping and the conveyance efficiency within the portion of the wastewater treatment system. For example, the pumping efficiency associated with the portion of the wastewater treatment system may be calculated and/or measured based on, for example, pump station run times, pressures in the associated wastewater transport lines (such as forcemains), and/or pump energy used, wastewater flow rate in a wastewater transport line, or the like. In an embodiment, a reference pumping and/or conveyance efficiency may be measured, e.g., which may represent a desired efficiency. For example, the pumping and/or conveyance efficiency may be measured and/or calculated following a cleaning of the portion of the wastewater treatment system (e.g., which may include removal of FOG accumulations and/or occlusions, purging of accumulated gasses, etc.). In the event of a deviation from the reference pumping and/or conveyance efficiency, a concentration of the added magnesium compound in the wastewater may be adjusted to increase the pumping and/or conveyance efficiency to a level that may be closer to measured or calculated reference efficiency.

For example, in an embodiment, measuring a pumping and/or conveyance efficiency may include measuring a current pumping and/or conveyance efficiency. The concentration of the added magnesium compound may be adjusted to improve the pumping and/or conveyance efficiency within the portion of the wastewater treatment system, for example, by comparison to the measured current pumping and/or conveyance efficiency and/or by comparison to a reference pumping and/or conveyance efficiency. Accordingly, the concentration of the added magnesium compound may be adjusted to provide an effective quantity that may result in the increase in the pumping and/or conveyance efficiency associated with the portion of the wastewater treatment system. The concentration of the added magnesium compound may be further adjusted, e.g., based on additional measurements of the pumping and/or conveyance efficiency. In some embodiments, the quantity of the magnesium compound added to the wastewater may serve as a proxy for the concentration of the added magnesium compound.

As generally discussed, in some embodiments pumping and/or conveyance efficiency may be increased, for example, by reducing accumulation and/or emission of gasses within the wastewater. For example, in wastewater treatment systems air and gases may accumulate in wastewater via induction, for example, where air and water contact, or may arise from biogenic sources. Example of such gasses that may accumulate in the wastewater, and/or may be emitted by the wastewater, may include, but are not limited, to $N_2$, $H_2S$, $NH_3$, $CO_2$, $CH_4$, $NO_x$, and $O_2$, and the like. Such gasses in the wastewater may, for example, create backpressure in a wastewater transport line (such as a forcemain) that must be overcome by upstream pumping equipment, thereby reducing the pumping efficiency of the associated portion of the wastewater treatment system. Additionally/alternatively, gasses in the wastewater adjacent a pump inlet may reduce the pumping efficiency, e.g., based on the resulting suction head and/or cavitation.

Accordingly, in an embodiment, the effective amount of the magnesium compound may include an effective amount to reduce one or more of accumulation and emission of gasses within the wastewater in the portion of the wastewater treatment system. As will be discussed further below, in some embodiments, magnesium compounds, such as magnesium hydroxide and/or magnesium oxide may reduce the accumulation and/or emission of gasses from the wastewater. Such a reduction of accumulated gasses within the wastewater may increase the pumping and/or conveyance efficiency of the association portion of the wastewater treatment system.

Additionally, in some embodiments, the reduction of gasses in the wastewater may reduce the frequency and/or volume of gasses eliminated form the wastewater treatment system via ARV's. The reduction of gasses eliminated from the wastewater treatment system via ARV's may also reduce the nuisance effect that may result from the odor of released gasses proximate human populations.

In some embodiments, adding an effective amount of magnesium compounds to the wastewater to reduce accumulation and/or emission of gasses in the wastewater may include measuring a gas volume generated in the portion of the wastewater treatment system. A concentration of the added magnesium compound may be adjusted to reduce the measured gas volume generated and/or present in the portion of the wastewater treatment system. For example, gas volumes that have accumulated in wastewater may be measure at one or more locations in the portion of the wastewater treatment system of interest. For example, samples of the wastewater may be collected and may be tested to measure entrained gasses in the wastewater. The concentration of added magnesium compounds may be adjusted to reduce the measured gas volume generated and/or present in the portion of the wastewater treatment system. Reduction of the measured gas volume may be based on, for example, a comparison between an initial measurement of gas volume and one or more subsequent measured gas volumes, between period measurements of gas volume, or the like.

For example, based on an initial quantity of added magnesium compound and a resulting decrease in the measured gas volume, a greater or lesser amount of the magnesium compound may be added and additional measurements of the gas volume may be made. Subsequent adjustments to the amount of the magnesium compounds added to the wastewater may be made, e.g., based on the additional measurements of the gas volume. As generally discussed above, the amount and/or quantity of magnesium compound added to the wastewater may be used as a proxy for the actual concentration of magnesium compound present in the wastewater.

In a generally similar manner, in some embodiments, addition of an effective amount of magnesium compounds to the wastewater to reduce accumulation and/or emission of gasses in the wastewater may include measuring a gas volume of gasses expelled from one or more air release valves associated with the portion of the wastewater treatment system. A concentration of the added magnesium compound may be adjusted to reduce the measured gas volume of gasses expelled from the one or more ARV's. Consistent with such an embodiment, the volume of gasses expelled from one or more air release valves may be measured. In some embodiments, measuring the volume of gasses expelled from the one or more ARV's may include measuring the actual volume of gasses expelled from the one or more ARV's, the frequency of gas release through the one or more ARV's, and/or another measure of the volume of gasses released through the one or more ARV's. In a similar manner as discussed above, the concentration of added magnesium compounds may be adjusted to reduce the measured volume of gasses released through the one or more ARV's, e.g., based on changes in gasses released through the one or more ARV's relative to prior and/or reference measurements.

In some situations, as discussed above, at least a portion of pumping and/or conveyance inefficiencies in a wastewater treatment system may arise from the accumulation of FOG and/or from partial or complete FOG occlusions. In such an embodiment, the effective amount of the magnesium compound may include an effective amount to reduce one or more of occlusion and accumulation of fat, oil and grease in the portion of the wastewater treatment system. Magnesium compounds, such as magnesium hydroxide and/or magnesium oxide may be capable of reducing FOG that can accumulate in wastewater throughout the wastewater treatment system, for example, through chemical and/or biological enhancement mechanisms.

In an embodiment, adding an effective amount of the magnesium compound to the wastewater to reduce FOG accumulation and/or occlusion may include measuring one or more FOG accumulations within the portion of the wastewater treatment system. For example, one or more accumulations of FOG within the portion of the wastewater treatment system may be identified and measured, e.g., to determine at least an approximate coverage, size, and/or quantity of FOG. A concentration of the added magnesium compound may be adjusted to reduce the measured fat, oil, and grease accumulations within the portion of the wastewater treatment system. For example, a quantity of the magnesium compound may be added to the portion of the wastewater treatment system (e.g., at a point that is upstream of the measured FOG accumulation). The previously measured accumulation of FOG may be re-measured, e.g., to evaluate changes in the approximate coverage, size, and/or quantity of FOG. Based on, e.g., changes in the coverage, size, and/or quantity of FOG, the concentration of the added magnesium compound may be adjusted, e.g., to achieve a desired reduction and/or rate of reduction, of the FOG accumulation. As with any embodiment herein, a quantity of added magnesium compound may be utilized and/or adjusted as a proxy for the concentration of the magnesium compound in the wastewater.

In an embodiment, adjusting the concentration of the magnesium compound may include adjusting the concentration of the magnesium compound to provide a pH of the wastewater in the portion of the wastewater treatment system of between about 7.5 and about 9. For example, in at least some situations, the solubility of FOG and/or the solubility of certain gases may be at least partially dependent on pH. Additionally/alternatively, in at least some situations the health and/or metabolism of certain microorganisms may also be dependent on pH. In this regard, it has been experimentally identified that in some situations a pH environment in wastewater between about pH 7.5 and about pH 9 may be suited to slow the growth and metabolism of bacteria that produce gases that may accumulate in wastewater. Further, in some situations it has been experimentally shown that a pH environment in wastewater of between about pH 7.5 and about pH 9 may be suited to prevent the release of gases that have accumulated in the wastewater from leaving the wastewater stream and entering the headspace of the pipe, forcemain or conveyance system. Similarly, it has been found in some experimental embodiments that a pH environment in the wastewater between about pH 7.5 and about pH 9 may facilitate the removal and/or may prevent accumulation of FOG in wastewater treatment system transport pipes, forcemains or conveyance system. In some embodiments, a wastewater environment having a pH in the range of between about 7.5 to about 9 provide one or more of chemical solubilization and biological degradation that may mitigate FOG accumulation.

While pH from approximately 7.5 to approximately 9 may be utilized, different pH range may be utilized. For example, a pH of between about 8.5 and about 9 may be utilized in some embodiments. Other pH ranges, including ranges extending above and/or below the range of between about pH 7.5 to about pH 9 may be utilized in some embodiments. In some embodiments, the pH of the wastewater may be adjusted utilizing the magnesium compound and/or may be otherwise adjusted.

Adjusting the concentration of the magnesium compound may, in some embodiments, include adjusting the concentration of the magnesium compound to provide between about 0.5mg/L to about 10,000 mg/L of magnesium hydroxide in the wastewater in the portion of the wastewater treatment system. The concentration of the magnesium compound may be selected based on the quantity necessary to adequately prevent gas accumulation and/or emission from the wastewater and/or to reduce the accumulation of FOG in the wastewater treatment system. Various additional/alternative concentration ranges may equally be utilized, e.g., based on, at least in part, the chemistry and/or the biology of the wastewater. In some embodiments, adjusting the concentration of the magnesium compound may include adjusting the concentration of the magnesium compound to provide between about 5 mg/L to about 4,000 mg/L of magnesium hydroxide in the wastewater in the portion of the wastewater treatment system. In an embodiment, adjusting the concentration of the magnesium compound may include adjusting the concentration of the magnesium compound to provide between about 5 mg/L to about 1,000mg/L of magnesium hydroxide in the wastewater in the portion of the waste water treatment system. For example, in an experimental embodiment, an effective concentration of a magnesium compound for reducing FOG and gas accumulation was in a range of between approximately 40 mg/L to approximately 105 mg/L.

Various locations throughout the wastewater treatment system may be identified where the accumulation of gases or FOG may cause problematic restrictions in the transportation or pumping of wastewater. As generally discussed above, it may be advantageous to add the effective quantity of magnesium compound at upstream locations relative to such identified locations. Examples of suitable injection points for the magnesium compounds may include, but are not limited to, an accessible manhole, a pumping station, a lift station, a wastewater junction structure, or a forcemain.

For example, a pumping or lift station may provide ample space, security, electricity, and access wastewater for the injection of the magnesium compound into the wastewater. In an embodiment, the magnesium compound may be injected into a wet-well or a point upstream of the wet-well to allow for adequate contact time between the magnesium compound and the wastewater prior to reaching the targeted problem areas for gas or FOG accumulation.

With reference to FIG. 1, an example wastewater treatment system is schematically depicted, including various locations and/or processes that may be subject to gas accumulation and/or emission and/or may be subject to FOG accumulation and/or occlusion. As discussed above, application of the magnesium compound to a portion of the wastewater treatment system may, in some embodiments, advantageously occur upstream relative to such locations that may be subject to gas accumulation and/or emission and/or may be subject to FOG accumulation and/or occlusion.

In the illustrated embodiment, wastewater may be received, collected and conveyed, by gravity and/or pumping at the wastewater collection system 10. The wastewater collected at wastewater collection system 10 may be conveyed to a wastewater processing system (e.g., wastewater processing system 12). Wastewater received from wastewater collection system 10 may be received at headworks and preliminary treatment 14 of wastewater processing system 12. Headworks and preliminary treatment 14 of wastewater processing system 12 may provide, for example, removal of grit from the received waste water and preliminary screening. Headworks and preliminary treatment 14 may be a location within wastewater processing system 12 that may be prone to gas emission from the waste water and/or FOG accumulation.

Primary treatment/clarification 16 may generally provide the first process within wastewater processing system 12 in which solids and water may diverge to follow separate treatment trains. As such, primary treatment clarification 16 may often be adversely affected by FOG accumulations that may be conveyed from collection system 10 into wastewater processing system 12.

In the example embodiment of FIG. 1, the diverging water and solids treatment trains may undergo various processes. For example, wastewater entering wastewater processing system 12 may be conveyed from primary treatment/clarification 16 to biological treatment 18, which may also be referred to as secondary treatment, whether the processing utilized convention Active Sludge, biological nutrient removal, or other processing. Wastewater form biological treatment 18 may be conveyed to secondary/final clarification 20, where biosolids may be separated from the wastewater and may be transferred to a solids treatment train. Following secondary/final clarification 20, the waste water may undergo disinfection 22 and final effluent 24, e.g., which may include optional pH adjustment.

In the illustrative example of FIG. 1, a solids treatment train may treat solids that enter wastewater processing system 12, either directly and/or biosolids that may be generated within wastewater processing system 12 (e.g., via secondary/final clarification 20). For example, solids may undergo digestion 26, which may include aerobic and/or anaerobic processing. In some embodiments, digestion 26 may be preceded by a solids thickening process. The digested solids may undergo storage and/or post digestion 28. Solids transfer 30 may proceed from digestion 26 to and thru storage and dewatering. The solids accumulated, produced, and treated within wastewater processing system 12 may undergo dewatering 32.

Figure 2:
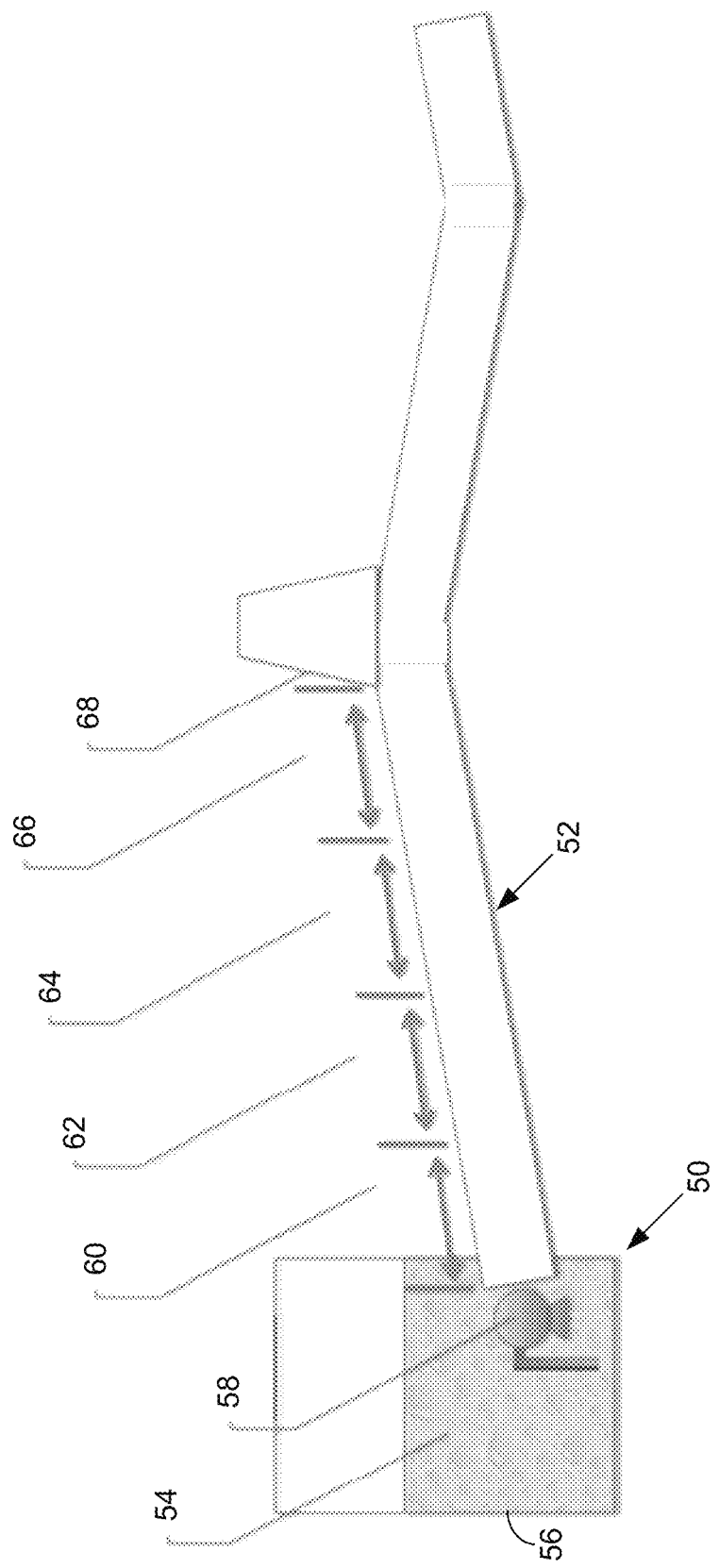
FIG. 2 schematically depicts an example embodiment of a collection system pumping station and forcemain of an example embodiment of a wastewater treatment system.

Referring also to FIG. 2, an example of a collection system pumping station 50 and forcemain 52 are schematically depicted. Wastewater 54 may be collected by pumping station 50 may often contain various quantities of organic material, e.g., that may be quantified by one or more of biological oxygen demand (BOD), total suspended solids (TSS), ammonia (NH3), dissolved oxygen (DO), nitrate ($-NO_3$), sulfate ($-SO_4$), and/or various other chemical characteristics such as pH and alkalinity, and/or other chemical components included in wastewater 54. Within wastewater 54 collected at pumping station 50, biological activity may work to degrade BOD. Under aerobic conditions, aerobic and nitrifying bacteria may use oxygen ($O_2$) to degrade BOD into carbon dioxide ($CO_2$) and water ($H_2O$) and degrade ammonia ($NH_3$) into nitrates ($-NO_3$). Under anoxic conditions, facultative and denitrifying bacteria may use nitrates to degrade BOD into $CO_2$, water, nitrogen gas ($N_2$) and $NO_x$. Under anaerobic conditions, anaerobic, acidogenic, acetogenic and methanogenic bacteria may use sulfates ($-SO_4$) and $CO_2$ to degrade BOD into $CO_2$, water, hydrogen ($H_2$), hydrogen sulfide ($H_2S$), methane ($CH_4$), organic acids, volatile acids (VA), and volatile organic sulfur compounds (VOSC). In such situations, $CO_2$, $NH_3$, $H_2S$, $N_2$, $CH_4$ and VOSC may all contribute to the total gas evolved and/or produced from wastewater 54. The quantities of each gas may be dependent on the specific characteristics of the wastewater and the conditions to which the water is subjected.

Gasses produced in wastewater 54 located in wet-well 56 of pumping station 50 may reduce the pumping efficiency of pump 58, for example, as a result of decreased suction head at pump 58 and/or cavitation within pump 58. Additionally, pumping efficiency may be further reduced as a result of accumulation and/or adhesion of FOG within at the suction inlet of pump 58 and/or in the pump body of pump 58.

Residual dissolved oxygen (DO) present may be present in the wastewater exiting pump 58, e.g., at 60 within forcemain 52. Microorganisms in the wastewater system (e.g., at 60 within forcemain 52) may work under aerobic conditions further degrading BOD and $NH_3$ into $CO_2$, $H_2O$ and $NO_3$—. Downstream from pump 58 (e.g., at 62 within forcemain 52) residual dissolved oxygen may generally be depleted and facultative bacteria utilize $NO_3$— to degrade simple, small-chain organics working under anoxic conditions, producing $CO_2$ and $N_2$ as by-products within forcemain 52. Further downstream from pump 58 (e.g., at 64) both DO and $NO_3$— may have generally been depleted and sulfate reducing bacteria may utilize $SO_4$ to degrade BOD into $H_2S$, $CO_2$ and $NH_3$. Further downstream from pump 58 (e.g., at 66 within forcemain 52) acidogens and methanogens may work collectively to produce organic acids, $CO_2$, $H_2S$ and $CH_4$. As such, a variety of gasses may have accumulated in the wastewater within forcemain 52.

In the example embodiment, the accumulation of gasses (e.g., at 68) produced in pump station 50 and/or forcemain 52 may contributes to back pressure and constriction head losses that pump 58 must overcome to transport the wastewater through the collection system. In some embodiments, while an ARV may be used to release the accumulated gases and back-pressure, such use of an ARV, especially within a populated environment, may create undesirable odor issues at the point of release.

In addition to the accumulation of gasses within forcemain 52, FOG accumulation may also occur within forcemain 52, e.g., which may result in flow restrictions and greater backpressures that must be overcome by pump 58, and/or may even result in overflows of the system. Consistent with some embodiments of the present disclosure, magnesium compounds may be injected into the wastewater system, e.g., at a location upstream of problematic accumulations of gasses and/or FOG. For example, in the illustrated embodiment, magnesium compounds may be added to wet well 56, e.g., to reduce and/or eliminate gasses produced in wastewater 54 within wet well 56, and/or FOG accumulation around inlets or, or within, pump 58. The reduction of accumulated gasses and/or FOG may, for example, reduce suction impedances experienced by pump 58. Similarly, magnesium compounds added to wastewater 54 in wet well 56 may be transferred (e.g., via pump 58) to forcemain 52. Magnesium compounds transferred to forcemain 52 may similarly reduce gas and/or FOG accumulation within forcemain 52. The reduction of gas and/or FOG within forcemain 52 may reduce resulting backpressures, and may thereby increase pumping efficiency of pump 58. In addition to transferring magnesium compounds from wet well 56 to forcemain 52 via pump 58, magnesium compounds may be directly injected into forcemain 52 upstream of pump 58 to reduce gas/fog at 60-68, and thereby reduce backpressure and/or obstructions, and increase pumping efficiency of pump 58. A reduction in the accumulated gasses may also reduce the need for, and/or frequency of, gas release through one or more ARV's. As such, the need for periodic maintenance to clean out FOG accumulations and/or the use ARV's (e.g., which may give rise to odor issues in surrounding areas), may be reduced and/or eliminated.

As mentioned above, the use of magnesium compounds has been described in detail for the purpose of illustration, and not of limitation. All embodiments of this disclosure may equally be implemented using sodium hydroxide, calcium oxide, calcium hydroxide and/or combinations thereof as an alternative to the described magnesium compound. As such, the instant disclosure should be understood to include such alternatives.

A number of implementations have been described. Nevertheless, it will be understood that various modifications may be made. Accordingly, other implementations are within the scope of the following claims.

What is claimed is:

1. A method comprising:
adding an effective amount of a magnesium compound to wastewater within a municipal wastewater treatment system to increase at least one of a pumping and a conveyance efficiency of the wastewater within at least a portion of the wastewater treatment system, including:
measuring at least one of the pumping and the conveyance efficiency of the wastewater within the portion of the wastewater treatment system including measuring one or more of pump station run times, pressures in one or more wastewater transport lines, and pump energy used;
comparing the measured at least one of the pumping and the conveyance efficiency to one or more of a reference pumping and conveyance efficiency; and
adjusting a concentration of the added magnesium compound in response to a deviation in the measured at least one of the pumping and the conveyance efficiency within the portion of the wastewater treatment system from the one or more of the reference pumping and conveyance efficiency.

2. The method of claim 1, wherein adjusting the concentration of the magnesium compound includes adjusting the concentration of the magnesium compound to provide a pH of the wastewater in the portion of the wastewater treatment system of between about 7.5 and about 9.

3. The method of claim 1, wherein adjusting the concentration of the magnesium compound includes adjusting the concentration of the magnesium compound to provide between about 0.5 mg/L to about 10,000 mg/L of magnesium hydroxide in the wastewater in the portion of the wastewater treatment system.

4. The method of claim 1, wherein adding the magnesium compound includes adding a magnesium hydroxide slurry to the wastewater.

5. The method of claim 4, wherein the magnesium hydroxide slurry includes between about 1% to about 90% magnesium hydroxide solids.

6. The method of claim 1, wherein the magnesium compound includes one or more of magnesium oxide and magnesium hydroxide.

7. The method of claim 1, wherein the effective amount of the magnesium compound includes an effective amount to reduce one or more of accumulation and emission of gasses within the wastewater in the portion of the wastewater treatment system.

8. The method of claim 1, wherein the effective amount of the magnesium compound includes an effective amount to reduce one or more of occlusion and accumulation of fat, oil and grease in the portion of the wastewater treatment system.

9. A method comprising:
adding an effective amount of a magnesium compound to wastewater within a municipal wastewater treatment system to reduce one or more of accumulation and emission of gasses within the wastewater within at least a portion of the wastewater treatment system including
measuring a gas volume generated in the portion of the wastewater treatment system including measuring one or more of a gas volume expelled from one or more air release valves associated with the portion of the wastewater treatment system, and a frequency of gas release through the one or more air release valves;
comparing the measured gas volume to a reference gas volume generated in the portion of the wastewater treatment system; and
adjusting a concentration of the added magnesium compound in response to a deviation in the measured gas volume generated in the portion of the wastewater treatment system from the reference gas volume.

10. The method of claim 9, further comprising:
measuring a gas volume of gasses expelled from one or more air release valves associated with the portion of the wastewater treatment system, and
adjusting a concentration of the added magnesium compound to reduce the measured gas volume of gasses expelled from the one or more air release valves.

11. The method of claim 9, wherein the magnesium compound includes one or more of magnesium oxide and magnesium hydroxide.

12. The method of claim 9, wherein the effective amount of the magnesium compound achieves a pH of between about 7.5 to about 9 in the wastewater within the portion of the wastewater treatment system.

13. The method of claim 9, wherein the effective amount of the magnesium compound achieves a concentration of magnesium hydroxide within the wastewater of between about 0.5 mg/L and about 10,000 mg/L within the portion of the wastewater treatment system.

14. A method comprising:
adding an effective amount of a magnesium compound to wastewater within a municipal wastewater treatment system to reduce one or more of occlusions and accumulation of fat, oil and grease within at least a portion of the wastewater treatment system, including:
   measuring at least one of the pumping and the conveyance efficiency of the wastewater within the portion of the wastewater treatment system including measuring one or more of pump station run times, pressures in one or more wastewater transport lines, and pump energy used;
   comparing the measured at least one of the pumping and the conveyance efficiency to one or more of a reference pumping and conveyance efficiency; and
   adjusting a concentration of the added magnesium compound in response to a deviation in the measured at least one of the pumping and the conveyance efficiency within the portion of the wastewater treatment system from the one or more of the reference pumping and conveyance efficiency.

15. The method of claim 14, further comprising:
measuring one or more fat, oil, and grease accumulations within the portion of the wastewater treatment system; and
adjusting a concentration of the added magnesium compound to reduce the measured fat, oil, and grease accumulations within the portion of the wastewater treatment system.

16. The method of claim 14, wherein the magnesium compound includes one or more of magnesium oxide and magnesium hydroxide.

17. The method of claim 14, wherein the effective amount of the magnesium compound achieves a pH of between about 7.5 to about 9 in the wastewater within the portion of the wastewater treatment system.

18. The method of claim 14, wherein the effective amount of the magnesium compound achieves a concentration of magnesium hydroxide within the wastewater of between about 0.5 mg/L and about 10,000 mg/L within the portion of the wastewater treatment system.

* * * * *